United States Patent
Frederick et al.

(10) Patent No.: US 7,005,772 B1
(45) Date of Patent: Feb. 28, 2006

(54) STATOR WINDING HAVING TWO SLOTS PER PHASE PER POLE

(75) Inventors: Dean Mark Frederick, Clinton, MI (US); Kirk E. Neet, Saline, MI (US)

(73) Assignee: Visteon Global Technologies, Inc., Van Buren Township, MI (US)

( * ) Notice: Subject to any disclaimer, the term of this patent is extended or adjusted under 35 U.S.C. 154(b) by 0 days.

(21) Appl. No.: 11/100,012

(22) Filed: Apr. 6, 2005

(51) Int. Cl.
*H02K 1/00* (2006.01)

(52) U.S. Cl. ............................ 310/179; 310/198
(58) Field of Classification Search ................ 310/194, 310/254, 260, 208, 179, 198
See application file for complete search history.

(56) References Cited

U.S. PATENT DOCUMENTS

| | | | |
|---|---|---|---|
| 3,325,661 A | 6/1967 | Parsons | |
| 3,746,899 A | 7/1973 | Eastham | |
| 4,473,788 A | 9/1984 | Kirschbaum | |
| 5,898,251 A | 4/1999 | Mochizuki et al. | |
| 6,198,190 B1 | 3/2001 | Umeda et al. | |
| 6,201,332 B1 * | 3/2001 | Umeda et al. | 310/184 |
| 6,376,960 B1 | 4/2002 | Milet et al. | |
| 6,414,410 B1 | 7/2002 | Nakamura et al. | |
| 6,433,456 B1 | 8/2002 | Higashino et al. | |
| 6,472,790 B1 | 10/2002 | Rose, Sr. | |
| 6,570,290 B1 | 5/2003 | Kazmierczak | |
| RE38,464 E | 3/2004 | Kusase et al. | |
| 6,707,214 B1 | 3/2004 | Fei | |
| 6,784,583 B1 * | 8/2004 | Umeda | 310/179 |
| 6,798,106 B1 | 9/2004 | Nakamura et al. | |
| 2002/0175589 A1 | 11/2002 | Takizawa et al. | |
| 2003/0214196 A1 | 11/2003 | Cai et al. | |

FOREIGN PATENT DOCUMENTS

| | | | |
|---|---|---|---|
| JP | 57052337 | | 3/1982 |
| JP | 405161295 A | * | 7/1993 |
| JP | 6105508 | | 4/1994 |

* cited by examiner

*Primary Examiner*—Darren Schuberg
*Assistant Examiner*—Heba Elkassabgi
(74) *Attorney, Agent, or Firm*—Brinks Hofer Gilson & Lione

(57) ABSTRACT

A stator for an electric machine includes a generally cylindrically-shaped stator core having a plurality of circumferentially-spaced and axially-extending core teeth that define a plurality of circumferentially-spaced and axially-extending core slots extending between first and second ends of the stator core. Within the core is a stator winding having a plurality of phases, each of the phases including a pair of conductors connected in parallel and having a plurality of slot segments housed in the core slots. The slot segments are alternately connected at the first and second ends of the stator core by a plurality of end loop segments. The conductors within each pair of each phase are connected in parallel and are in phase with one another such that the stator core has two slots per phase per pole.

19 Claims, 9 Drawing Sheets

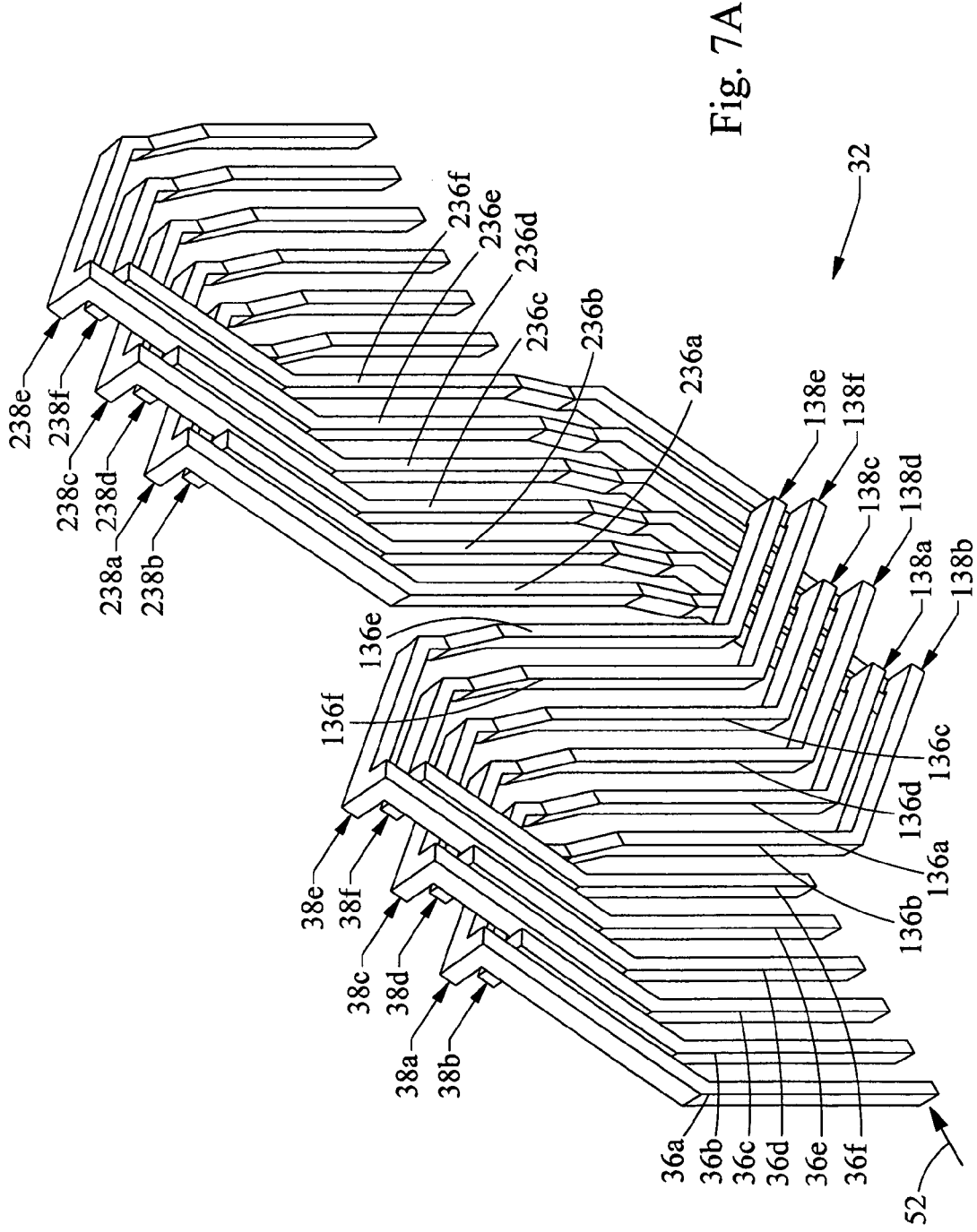

STATOR WINDING HAVING TWO SLOTS PER PHASE PER POLE

FIELD OF THE INVENTION

The present invention relates generally to electric machines and, in particular, to a stator for an electric machine having a core and a winding.

BACKGROUND OF THE INVENTION

Electric machines, such as alternating current electric generators, or alternators are well known. Prior art alternators typically include a stator assembly and a rotor assembly disposed in an alternator housing. The stator assembly is mounted to the housing and includes a generally cylindrically-shaped stator core having a plurality of slots formed therein. The rotor assembly includes a rotor attached to a generally cylindrical shaft that is rotatably mounted in the housing and is coaxial with the stator assembly. The stator assembly includes a plurality of wires wound thereon, forming windings. The stator windings are formed of slot segments that are located in the core slots and end loop segments that connect two adjacent slot segments of each phase and are formed in a predetermined multi-phase (e.g. three or six) winding pattern in the slots of the stator core.

The rotor assembly can be any type of rotor assembly, such as a "claw-pole" rotor assembly, which typically includes opposed poles as part of claw fingers that are positioned around an electrically charged rotor coil. The electric current in the rotor coil produces a magnetic field in the claw fingers. As a prime mover, such as a steam turbine, a gas turbine, or a drive belt from an automotive internal combustion engine, rotates the rotor assembly, the magnetic field of the rotor assembly passes through the stator windings, inducing alternating electrical currents in the stator windings in a well known manner. The alternating electrical currents are then routed from the alternator to a distribution system for consumption by electrical devices or, in the case of an automotive alternator, to a rectifier and then to an automobile battery.

One type of device is a high slot fill stator, which is characterized by rectangular shaped conductors whose width, including any insulation fit closely to the width, including any insulation of the rectangular shaped core slots. High slot fill stators are advantageous because they are efficient and help produce more electrical power per winding than other types of prior art stators.

One disadvantage of a six phase high slot fill stator is that it requires six diode pairs (one for each phase). This increases the cost of the stator due to the high cost of the diode pairs. A machine having three diode pairs has been developed having a three phase winding wherein each phase is comprised of two conductors, one being shifter thirty electrical degrees with respect to the other. This solution have fewer diode pairs, but requires an additional reverse connection between the two conductors, thereby increasing cost as well as manufacturing complexity. Furthermore, this solution does not address the issue of the standard six pitch winding having high resistance due to the length of the conductor in each six pitch end loop segment. A conductor with reduced end loop length results in higher output, higher efficiency, lower stator temperatures, and lower cost.

Accordingly, there is a need for a stator winding that reduces the number of diode pairs, does not require any extra reverse connections, and reduces the length of the end loop segments, and therefore the electrical resistance.

SUMMARY OF THE INVENTION

A stator for a dynamoelectric machine according to the present invention includes a generally cylindrically-shaped stator core having a plurality of circumferentially-spaced and axially-extending core teeth that define a plurality of circumferentially-spaced and axially-extending core slots in a surface thereof. The core slots extend between a first and a second end of the stator core. The stator also includes a multi-phase stator winding.

Each of the phases includes a pair of conductors that are connected in parallel. Each conductor includes a plurality of slot segments disposed in the core slots that are alternately connected at the first and second ends of the stator core by a plurality of end loop segments. The slot segments and likely the end loop segments of a high slot fill winding are typically rectangular in cross sectional shape. The end loop segments of the winding may be interlaced or cascaded. An interlaced winding includes a majority of end loop segments that connect a slot segment housed in one core slot and in one radial position with a slot segment housed in another core slot in a different radial position. In contrast, a cascaded winding includes a majority of end loop segments that connect a slot segment housed in one radial position of a core slot with another slot segment housed in the same radial position of another core slot. The term radial position, utilized herein, refers to the position of a slot segment housed in the core slots with respect to the other slot segments housed in the same core slot—i.e. the outermost slot segment housed in a core slot is defined as being located in the outermost radial position, the second outermost slot segment housed in a slot is defined as being located in the second outermost radial position, and so forth. The term, conductor portion, utilized herein, is defined as being a portion of a conductor that includes at least three consecutive slot segments connected by at least two end loop segments. A cascaded winding is further defined as a winding including a plurality of conductor portions of all of the phases located in the same general circumferential location, wherein all of the conductor portions could be sequentially radially inserted from the central axis of the stator core.

In an aspect, each pair of conductors within a single phase are connected to one another in parallel and are in phase with one another such that the stator core has two slots per phase per pole. More specifically, each pair of conductors includes a first conductor and a second conductor. At a given circumferential location, the first conductor has an end loop segment pitch of N, and the second conductor has an end loop segment pitch of N-2. The end loop segments of the first and second conductors within each pair do not cross one another.

In another aspect, the conductors within the stator winding are connected to one another in a delta or wye configuration. Each terminal of the stator winding is connected to a diode pair.

DESCRIPTION OF THE DRAWINGS

The above, as well as other advantages of the present invention, will become readily apparent to those skilled in the art from the following detailed description of a preferred embodiment when considered in the light of the accompanying drawings in which:

FIG. 7a is a perspective view of a layer of end loop segments of a portion of a stator winding in accordance with the present invention including the end loop segments of FIG. 7;

DESCRIPTION OF THE EMBODIMENTS

Figure 1:
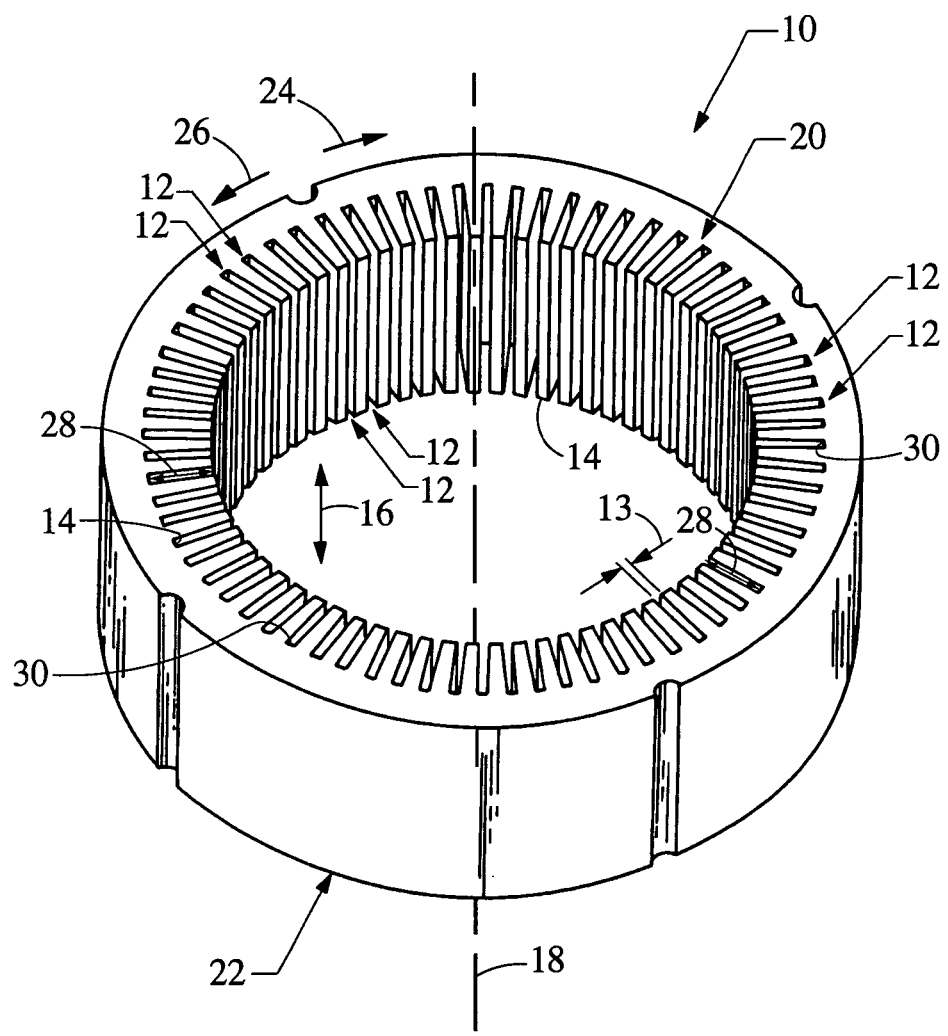
FIG. 1 is a perspective view of a stator core in accordance with the present invention prior to insertion of the stator winding.

Referring now to FIG. 1, a generally cylindrically-shaped stator core is indicated generally at 10. The stator core 10 includes a plurality of core slots 12 formed in a circumferential inner diameter 14 thereof. The core slots 12 extend in an axial direction, indicated by an arrow 16, parallel to a central axis 18 of the stator core 10 between a first end 20 and a second end 22 thereof. An axially upward direction is defined as moving toward the first end 20 of the stator core 10 and an axially downward direction is defined as moving toward the second end 22 of the stator core 10.

Preferably, the core slots 12 are equally spaced around the circumferential inner diameter 14 of the stator core 10. A circumferential clockwise direction is indicated by an arrow 24 and a circumferential counterclockwise direction is indicated by an arrow 26.

The core slots 12 define a radial depth 28, between ends 30 of the core slots 12 and the inner diameter 14 of the stator core 10. This radial depth 28 is along the radial direction. The core slots 12 are adapted to receive a stator winding, discussed in more detail below. A radial inward direction is defined as moving towards the central axis 18 of the stator core 10 and a radial outward direction is defined as moving away from the central axis 18. The core slots 12 may have rectangular cross sectional shape as can be seen in FIG. 1.

Figure 2:
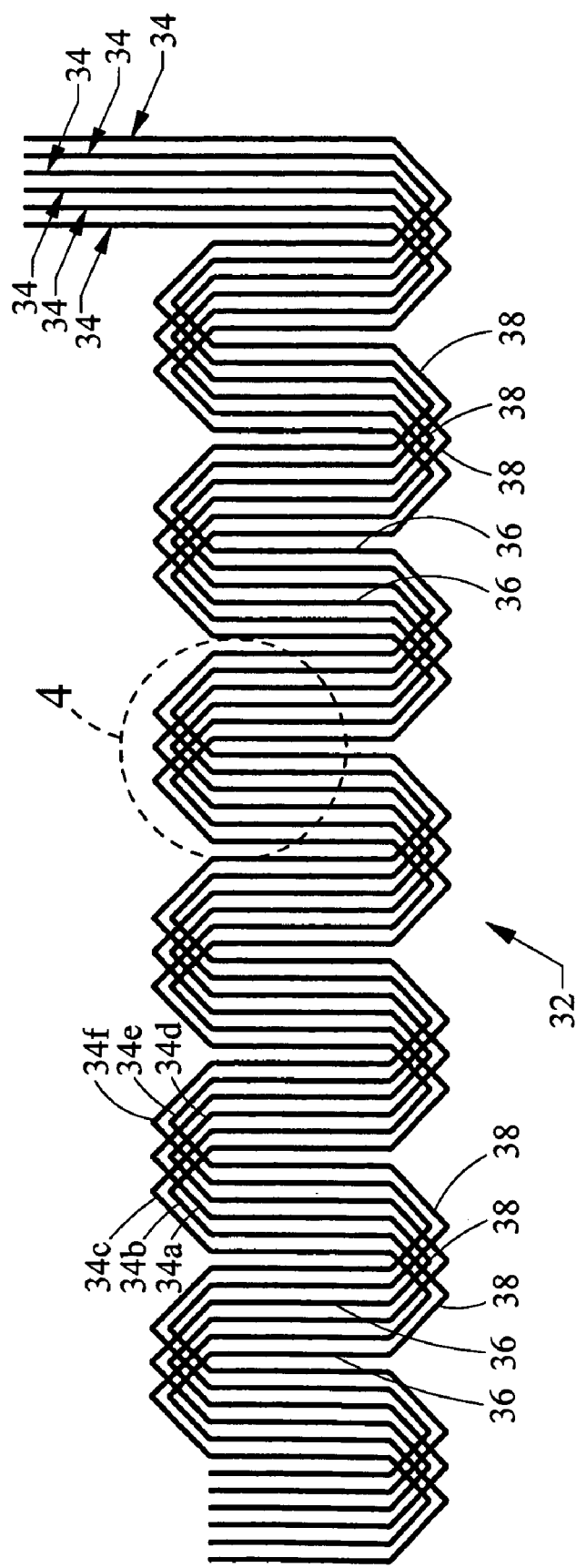
FIG. 2 is a schematic view of the winding for the stator removed from the stator core and laid flat.

Referring to FIG. 2, a stator winding 32 is shown removed from the stator core and laid flat. The winding 32 has a plurality of phases. Each phase is defined by a pair of conductors 34 connected in parallel. Each conductor 34 has a plurality of slot segments 36 housed in the core slots 12. The slot segments 36 are alternately connected at the first and second ends 20, 22 of the stator core 10 by a plurality of end loop segments 38.

Specifically, in FIG. 2, a first pair of conductors 34a, 34b define a first phase of the stator winding 32, a second pair of conductors 34c, 34d define a second phase of the stator winding 32, and a third pair of conductors 34e, 34f define a third phase of the stator winding 32.

In each pair of conductors 34, the conductors of the pair are in phase with one another such that the stator has two slots per phase per pole. More specifically, in prior stators of this generally type, each conductor defines a phase, so there is one slot per phase per pole. In the present application, since the conductors 34 are grouped into pairs that are in phase with one another, there are two slots per phase per pole.

Each pair of conductors 34 includes a first conductor and a second conductor. At a given circumferential location, the first conductor of each pair of conductors 34 has an end loop segment with a pitch of N, and the second conductor of each pair of conductors has a pitch of N-2. At the very next circumferential location, on the axial opposite end of the core, the first conductor of each pair of conductors 34 has an end loop segment with a pitch of N-2, and the second conductor of each pair of conductors has a pitch of N. In this way, the end loop segments of the first conductors and the segments of the second conductors do not cross one another.

Referring again to FIG. 2, in the first pair of conductors 34, the first conductor 34a and the second conductor 34b are connected in parallel. At certain circumferential locations on the first end 20 of the core, the first conductor 34a has a pitch of seven and the second conductor 34b has a pitch of five. At other certain circumferential locations at the second end 22 of the core, the first conductor 34a has a pitch of five and the second conductor 34b has a pitch of seven. At the second end 22 of the core, the first conductor 34a has and end loop segment 38 that spans five slots 12 within the stator core 10 and the second conductor 34b has an end loop segment 38 that spans seven slots 12 within the stator core 10. The pitch is the value that the end loop segment 38 spans between adjacent slot segments 36 of the same conductor 34.

Figure 3:
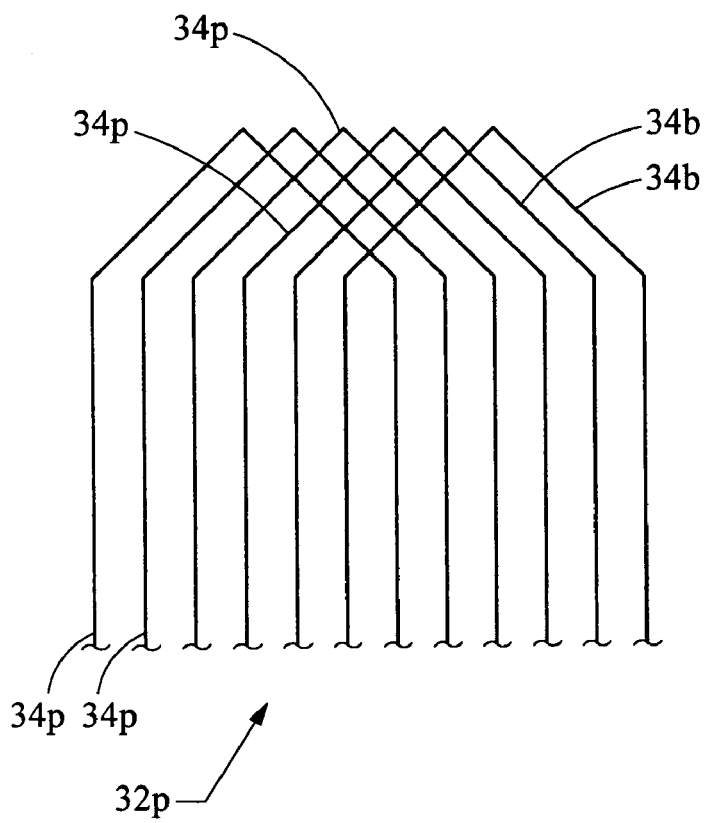
FIG. 3 is a schematic view of a portion of a prior art stator winding.
Figure 4:
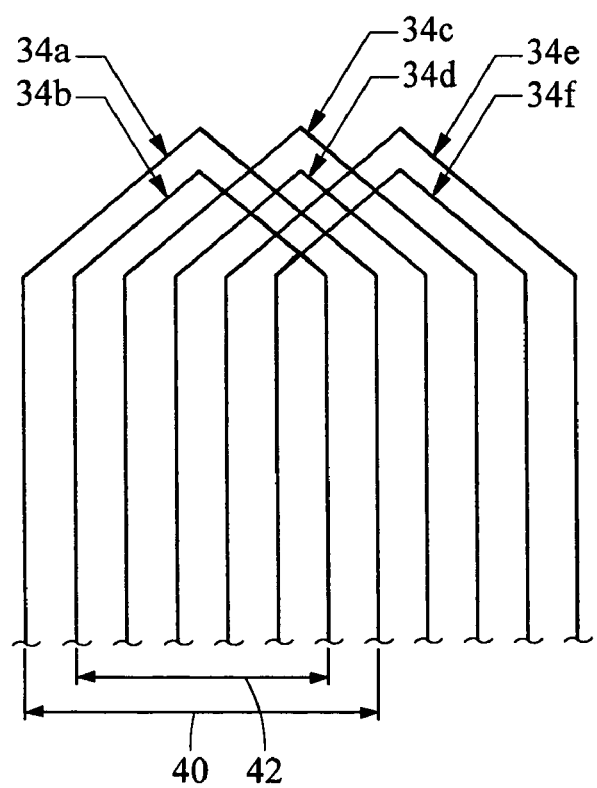
FIG. 4 is a enlarged view of a portion of FIG. 2.

In known stator windings of this type, typically, all of the conductors have a uniform pitch, as shown in FIG. 3. The stator winding shown in FIG. 3 includes six conductors 34p all having a pitch of six. Therefore, this stator winding 32p has one slot per phase per pole. Referring to FIG. 4, the first conductor 34a, 34c, 34e of each phase has a pitch of seven and spans seven slots, as indicated at 40. The second conductor 34b, 34d, 34f of each phase has a pitch of five and spans five slots, as indicated at 42.

Figure 5:
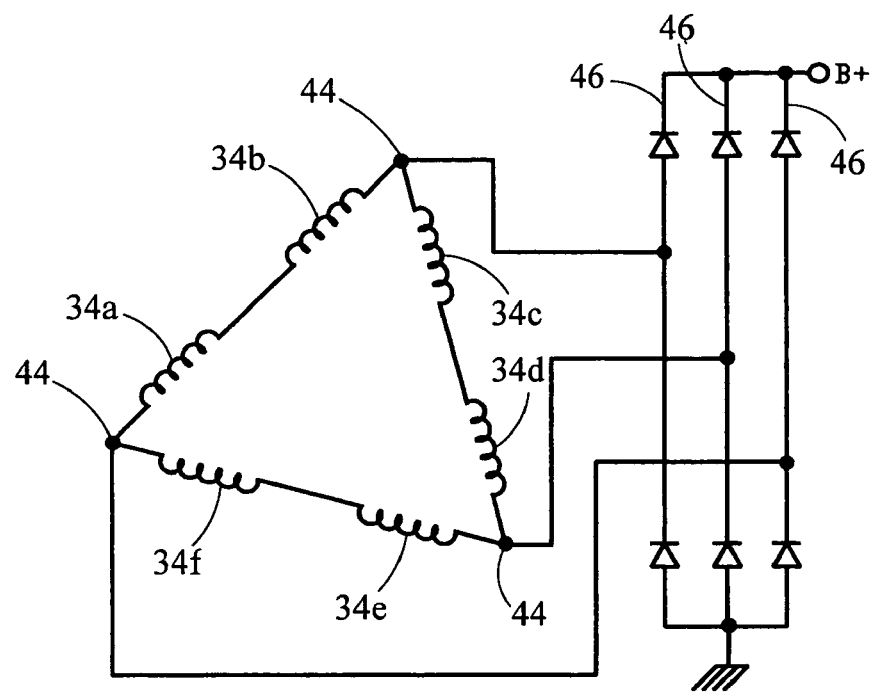
FIG. 5 is a schematic view of the windings of a stator core in accordance with the teachings of the present invention wherein the windings are connected in a delta configuration.
Figure 6:
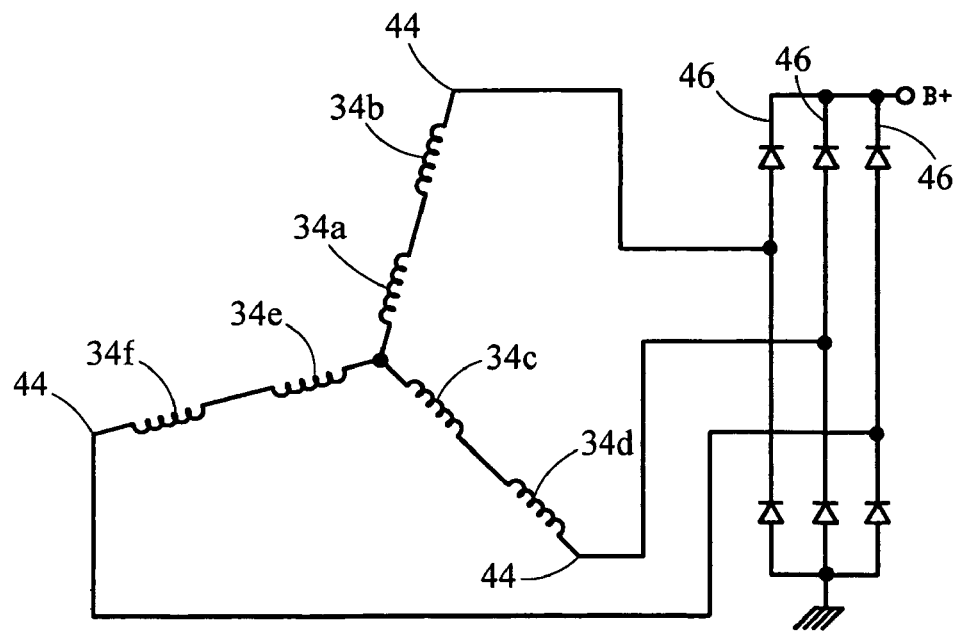
FIG. 6 is a schematic view of the windings of a stator core in accordance with the teachings of the present invention wherein the windings are connected in a wye configuration.

Referring to FIG. 5, the conductors 34 can be connected to one another in a delta configuration, or in a wye configuration as shown in FIG. 6. In each case, the terminals 44 of the conductors 34 are connected to rectifying diode pairs 46.

Figure 7:
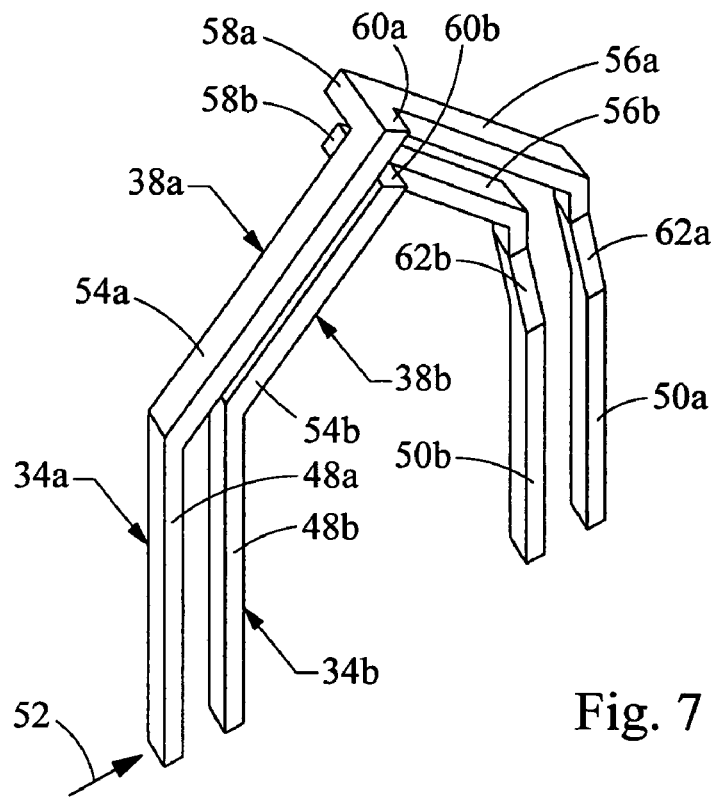
FIG. 7 is a perspective view of a pair of end loop segments of a portion of a stator winding in accordance with the present invention.

The conductors 34 are preferably formed as a cascaded winding 32. The cascaded winding 32 for the stator is shown in FIGS. 7 through 7c. Each of the continuous conductors 34 has a plurality of slot segments 36 disposed in the core slots 12. The term continuous, utilized herein, refers to a conductor 34 including at least two end loop segments 38 and connected to at least three slot segments 36 that extend circumferentially around the core 10 without any welds or connections.

The slot segments 38 are alternately connected at the first and second ends 20, 22 of the stator core 10 by the end loop segments 38. Each of the slot segments 36 of a particular layer are located in the same radial position and therefore are likely to be at substantially the same radial distance from the central axis 18 of the stator core 10 and the end loop segments 38 form a cascaded winding pattern.

Referring now to FIG. 7, the end loop segments 38a, 38b of the first and second conductors 34a, 34b of a conductor pair are adapted to be a part of the stator winding 32. Each conductor 34a, 34b includes a first substantially straight end portion 48a, 48b and a second substantially straight end portion 50a, 50b that are each proximate to a respective slot segment, discussed in more detail below, of the stator winding 32. The first end portions 48a, 48b and the second end portions 50a, 50b of the end loop segments 58a, 58b are at a substantially same radial distance from the central axis 18 of the stator core 10. The first end portions 48a, 48b and the second end portions 50a, 50b form a portion of a layer, indicated generally at 52, of the stator winding 32 whose slot segments 36 are located in the same radial position in the core slots 12. Although the end portions 48a, 48b, 50a, 50b are described as entities, they may, in fact, just be portions of the slot segments 36, discussed in more detail below.

Each end loop segment 58a, 58b includes a first sloped portion 54a, 54b and a second sloped portion 56a, 56b that meet at an apex portion 58a, 58b. The first sloped portions 54a, 54b are substantially co-radial with the slot segments 36 of the layer 52, the first end portions 48a, 48b and the second end portions 50a, 50b. The second sloped portions 56a, 56b are substantially non-co-radial with the slot segments 36 of the layer 52, the first end portions 48a, 48b and the second end portions 50a, 50b. Each apex portion 58a, 58b includes a first radial extension portion 60a, 60b. The first radial extension portions 60a, 60b extend from the first sloped portions 54a, 54b in the radially outward direction, which provides a radial outward adjustment for the end loop segments 38a, 38b. Second radial extension portions 62a, 62b connect the second sloped portions 56a, 56b and the second end portions 50a, 50b. The second radial extension portions 62a, 62b extend from the second sloped portions 56a, 56b in the radially inward direction, which provides a radial inward adjustment for the end loop segments 38a, 38b. Although the radial extension portions 60a, 60b, 62a, 62b shown in FIGS. 7, 7a, 7b, and 7c appear as sharp bends, it is obvious to those skilled in the art that typical radial extension portions would be more gentle in nature and include radii, not shown.

While the end loop segments 38a, 38b have been shown wherein the radial outward adjustment is adjacent the apex portions 58a, 58b and the radial inward adjustment is adjacent the second sloped portions 62a, 62b, those skilled in the art can appreciate that the radial outward and inward adjustments can be on any one or on any two of the first sloped portions 54a, 54b, the second sloped portions 56a, 56b, and the apex portions 58a, 58b in order to provide the cascaded winding pattern, described in more detail below.

Referring now to FIG. 7a, the pair of end loop segments 38a, 38b of FIG. 7 are shown adjacent two identical pairs of end loops segments 38c, 38d and 38e, 38f. The end loop segments 38a–38f each form a portion of the layer 52 of the stator winding 32. The end loop segments 38a–38f are shown in a three-phase winding pattern. In a this three-phase winding the end loop segments 38a, 38c, 38e of the first conductors 34a, 34c, 34e have a pitch equal to seven, as can be best seen in FIG. 7a where the end loop segment 38a connects a slot segment 36a disposed in a first core slot with another slot segment 136a disposed in a core slot which is located seven core slots from the first core slot. The end loop segments 38b, 38d, 38f of the second conductors 34b, 34d, 34f have a pitch equal to five, wherein the end loop segment 38b connects a slot segment 36b disposed in a first core slot with another slot segment 136b disposed in a core slot which is located five core slots from the first core slot.

The slot segments 136a, 136b extend through the core slots 12 to the second end 22 of the stator core 10. The slot segments 136a, 136b exit the second end 22 and attach to end loop segments 138a, 138b which are described in more detail below. The end loop segments 138a, 138b are attached at another end to slot segments 236a, 236b. The slot segments 236a, 236b extend upwardly through another two core slots 12 of the stator core 10 and attach to end loop segments 238a, 238b, which are substantially identical to the end loop segments 38a, 38b. The pattern of connecting end loop segments 38 and slot segments 36, as outlined above, continues about the circumference of the stator core 10 to form a first layer, such as the layer 52, of the stator winding 32.

Similarly, the end loop segments 38c and 38e connect slot segments 36c and 36e disposed in a core slot with another slot segment 136c and 136e disposed in a core slot which is located seven core slots away. The end loop segments 38d, 38f connect a slot segments 36d, 36f disposed in core slots with slot segments 136d, 136f disposed in core slots which are located five core slots away.

Slot segments 136c–136f extend through the core slots 12 to the second end 22 of the stator core 10. The slot segments 136c–136f exit the second end 22 and attach to end loop segments 138c–138f which are described in more detail below. The end loop segments 138c–138f are attached at another end to slot segments 236c–236f. The slot segments 236c–236f extend upwardly through core slots 12 of the stator core 10 and attach to end loop segments 238c–238f which are substantially identical to the end loop segments 38c–38f. The pitch of the end loop segments on the second end 22 of the core 10 are contrary to the end loop segments on the first end 20 of the core. The end loop segments 138a, 138c and 138e of the first conductors 34a, 34c, 34e have a pitch equal to five and the end loop segments 138b, 138d, 138f of the second conductors 34b, 34d, 34f have a pitch equal to seven.

Preferably, each of the slot segments 36a–36f, 136a–136f, and 236a–236f and each of the end loop segments 38a–38f, 138a–138f, and 238a–238f are formed from a rectangular wire and have a cross-sectional shape having a substantially constant circumferential width and radial width and therefore substantially equal area, however, other shapes could also be employed such as round, triangular or elliptical. For those skilled in the art, it is known that a square shaped conductor is considered a type of a rectangular shaped conductor and that a typical rectangular conductor may include radii on the corners intermediate two adjacent edges.

Figure 7B:
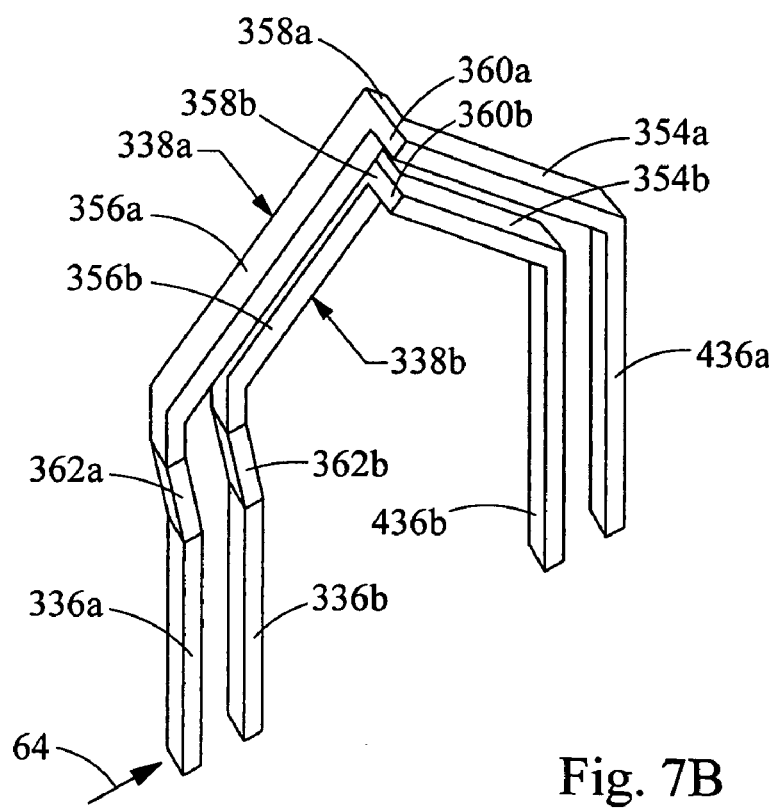
FIG. 7b is a perspective view of a pair of end loop segments similar to the pair shown in FIG. 7 but from a different layer within the stator core.
Figure 7C:
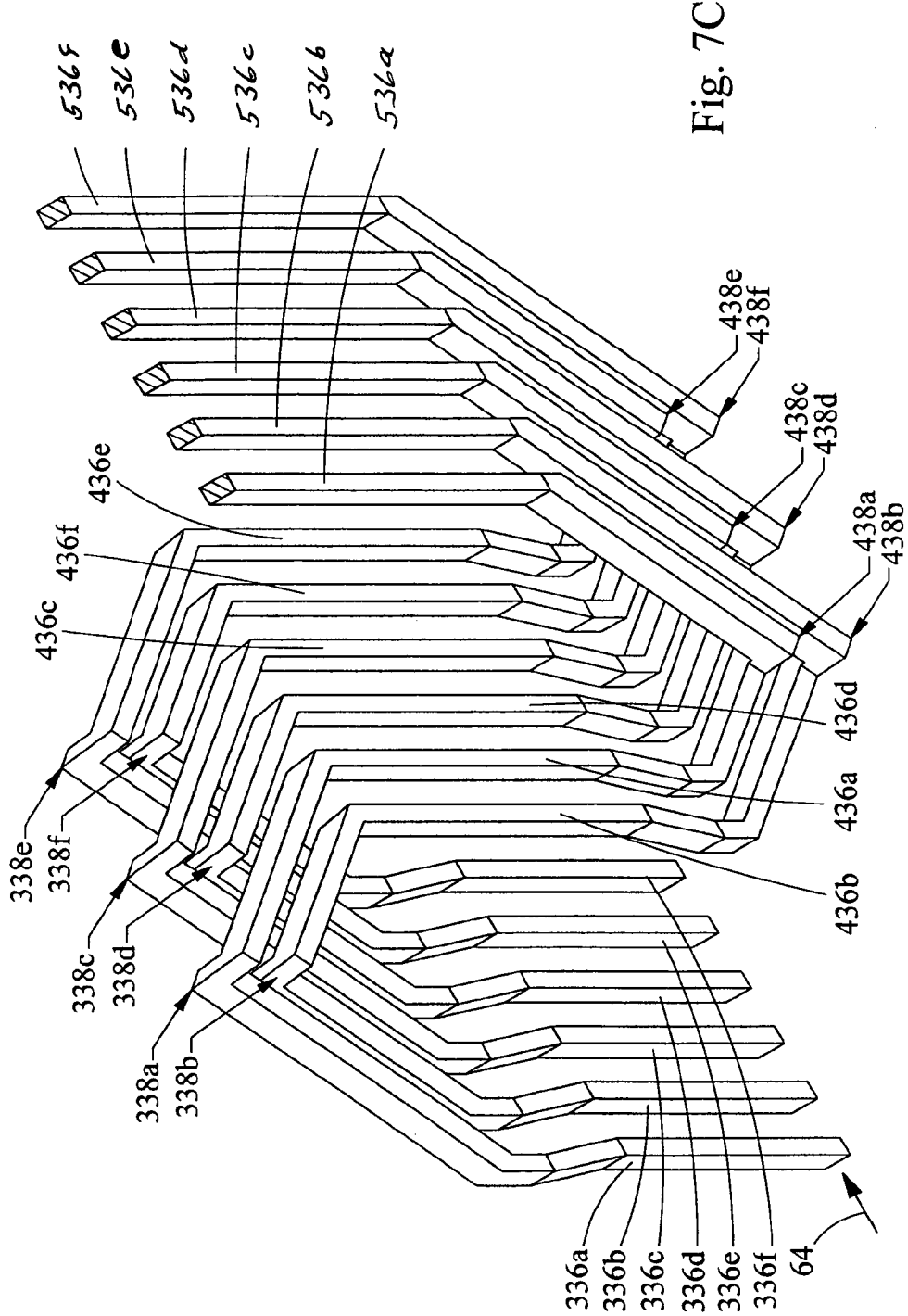
FIG. 7c is a perspective view of a layer of end loop segments of a portion of a stator winding in accordance with the present invention including the end loop segments of FIG. 7b.

Referring now to FIG. 7b, a pair of end loop segments from a second layer 64 of the stator winding 32 is shown. The end loop segments 338a, 338b include first sloped portions 354a, 354b and second sloped portions 356a, 356b connected by apex portions 358a, 358b. The first sloped portions 354a, 354b are substantially co-radial with the slot segments 336a, 336b, 436a, 436b of the second layer 64. The second sloped portions 356a, 356b are substantially non-co-radial with the slot segments 336a, 336b, 436a, 436b of the second layer 64. The apex portions 358a, 358b include first radial extension portions 360a, 360b. The first radial extension portions 360a, 360b extend from the first sloped portions 354a, 354b in the radially outward direction, which provides a radial outward adjustment for the end loop segments 358a, 358b. Second radial extension portions 362a, 362b connect the second sloped portions 356a, 356b and the slot segments 336a, 336b. The second radial extension portions 362a, 362b extend from the second sloped portions 356a, 356b in the radially inward direction, which provides a radial inward adjustment for the end loop segments 358a, 358b.

Referring now to FIG. 7c a second layer 64 of the stator winding 32 is shown. The second layer 64 is located radially inward of the first 52 at a predetermined radial distance from the first layer 52. Similarly to the first layer 52, the second layer 64 includes a first pair of end loop segments 338a, 338b, a second pair of end loop segments 338c, 338d, and a third pair of end loop segments 338e, 338f. The conductors of the second layer 64 including the end loop segments 338a–338f are similar to the conductors of the first layer 52 including the end loop segments 38a–38f, 138a–138f, and 238a–238f, except that they are inserted into the core slots 12, shifted by a predetermined number of slots, discussed in more detail below. Further, the end loop segments 338a–338f of the second layer extend radially outwardly at the apex portion in the counterclockwise direction 26, which is opposite the end loop segments 38a–38f, 138a–138f, and 238a–238f of the first layer 52, which extend radially outwardly at the apex 58 in the clockwise direction 24.

The end loop segments 338a–338f each form a portion of the second layer 64 of the stator winding 32. The end loop segments 338a–338f are shown in a three-phase winding pattern. In a this three-phase winding the end loop segments 338a, 338c, 338e of the first conductors have a pitch equal to seven, as can be best seen in FIG. 7c where the end loop segments 338a, 338c, 338e connect to slot segments 336a, 336c, 336e disposed in core slots 12 with other slot segments 436a, 436c, 436e disposed in core slots 12 which are located seven core slots 12 away. The end loop segments 338b, 338d, 338f of the second conductors have a pitch equal to five, wherein the end loop segments 338b, 338d, 338f connect to slot segments 336b, 336d, 336f disposed in a core slot 12 with other slot segments 436b, 436d, 436f disposed in a core slots which are located five core slots away. The pitch of the end loop segments on the second end 22 of the core 10 are contrary to the end loop segments on the first end 20 of the core. The end loop segments 438a, 438c and 438e of the first conductors have a pitch equal to five and the end loop segments 438b, 438d, 438f of the second conductors have a pitch equal to seven.

The slot segments 436a–436f extend through the core slots 12 to the second end 22 of the stator core 10. The slot segments 436a–436f exit the second end 22 and attach to end loop segments 438a–438f which are described in more detail below. The end loop segments 438a–438f are attached at another end to slot segments 536a–536f. The pattern of connecting end loop segments 38 and slot segments 36, as outlined above, continues about the circumference of the stator core 10 to form the second layer 64 of the stator winding 32.

Preferably, each of the slot segments 36a–36f, 136a–136f, 236a–236f, 336a–336f, 436a–436f, and 536a–536f and each of the end loop segments 38a–38f, 138a–138f, 238a–238f, 338a–338f, and 438a–438f are formed from a rectangular wire and have a cross-sectional shape having a substantially constant circumferential width and radial width and therefore substantially equal area, however, other shapes could also be employed such as round, triangular or elliptical. For those skilled in the art, it is known that a square shaped conductor is considered a type of a rectangular shaped conductor and that a typical rectangular conductor may include radii on the corners intermediate two adjacent edges.

Figure 7D:
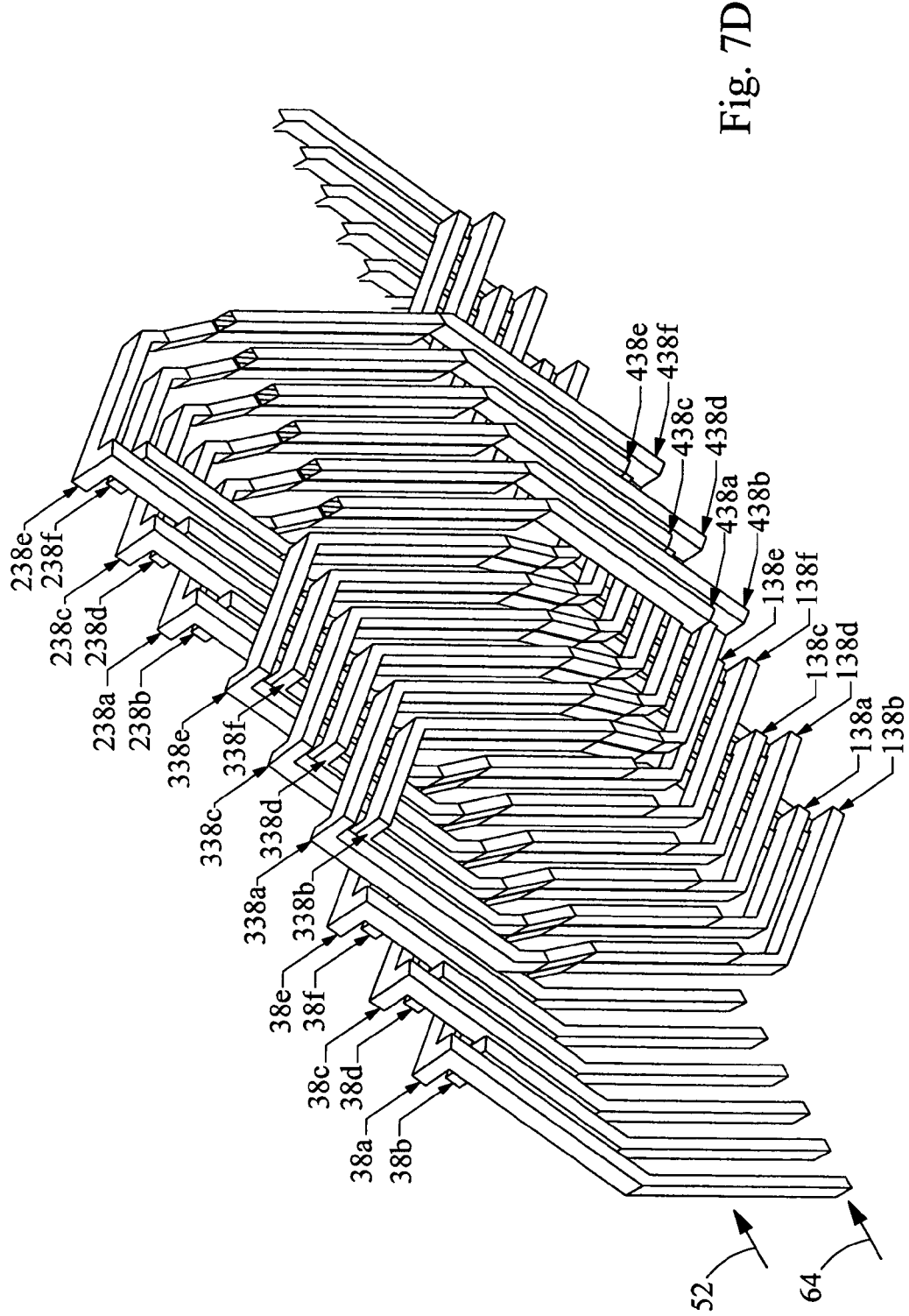
FIG. 7d is a perspective view of the layer shown in FIG. 7a cascaded with the layer shown in FIG. 7c.

As can best be seen in FIG. 7d, wherein the first and second layers are cascaded with one another, the non-co-radial portions of the end loop segments 338a–338f, 438a–438f extend radially outward where they become substantially co-radial with the slot segments 36a–36f, 136a–136f, and 236a–236f of the first layer 52, but because they are shifted by a predetermined number of slots, they do not violate the space of the end loop segments 38a–38f, 138a–138f, and 238a–238f of the first layer 52. This allows the end loop segments of the two layers, 52 and 64 to cascade together forming a two layer winding 32, which extends radially outward by one substantial wire width beyond the slot segments of the first layer 52 but does not substantially extend radially inward beyond the slot segments of the innermost layer.

For a winding with a plurality of layers, a third layer (not shown) which is substantially identical to the first layer 52, would have non-co-radial portions that would extend radially outward and be substantially co-radial with the slot segments 336a–336f, 436a–436f, 536a–536f of the second layer 64 and therefore cascade with the second layer 64. For a pattern where the radial layers alternate between being substantially identical with the first layer 52 and the second layer 64, a pattern develops where the winding 32 only extends radially outward by one wire width for the outermost layer 52 but not radially inward of the slot segments of the innermost layer. This cascading effect allows a winding 32 with a plurality of layers to be inserted into a stator core 10, that extend radially outwardly by one substantial wire width while not extending radially inwardly.

While the slot segments 36a–36f, 136a–136f, 236a–236f, 336a–336f, 436a–436f, and 536a–536f are shown generally coplanar in FIGS. 7a–7d for illustrative purposes, the slot segments 36a–36f, 136a–136f, 236a–236f, 336a–336f, 436a–436f, and 536a–536f are preferably adapted to be received by a radially curved surface, such as the interior surface of the stator core 10 and, therefore, are not coplanar but are co-radial. The width of each of the slot segments 36a–36f, 136a–136f, 236a–236f, 336a–336f, 436a–436f, and 536a–536f, including any insulation, preferably fits closely to the width of the core slots 12, including any insulation.

The stator winding 32 shown in FIGS. 2, 7a, 7b, and 7c is completely configured of end loop segments 34a–34f of FIG. 4 having a pitch equal to N or N-2. However, it is obvious to those skilled in the art, that a stator winding (not shown) may have end loop segments such as 34a–34f in FIG. 4 on the first end 20 of the stator core 10 having a pitch equal to N or N-2 and end loop segments such as 34b in FIG. 3 on the second end 22 of the stator core 10 having a pitch equal to N-1.

Figure 8:
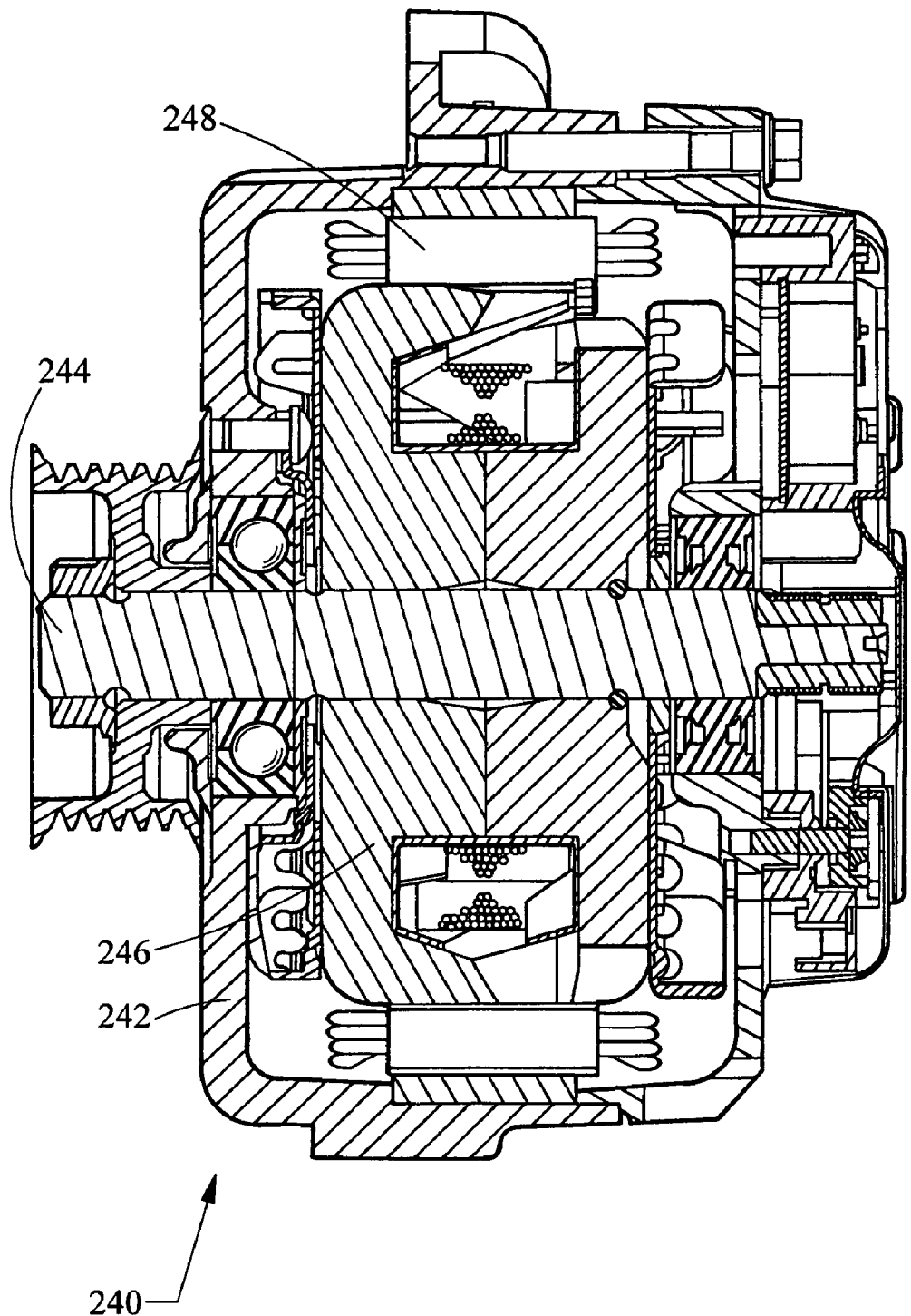
FIG. 8 is a cross sectional view of an alternator in accordance with the present invention.

Referring now to FIG. 8, a dynamoelectric machine in accordance with the present invention is indicated generally at 240. The dynamoelectric machine 240 is preferably an alternator, but those skilled in the art will appreciate that the dynamoelectric machine 240 can be, but is not limited to, an electric motor, a starter-generator, or the like. The dynamoelectric machine 240 includes a housing 242 having a shaft 244 rotatably supported by the housing 242. A rotor assembly 246 is supported by and adapted to rotate with the shaft 244. The rotor assembly 246 can be, but is not limited to, a "claw pole" rotor, a permanent magnet non claw pole rotor, a permanent magnet claw pole rotor, salient field wound rotor, or an induction type rotor. A stator assembly 248 is fixedly disposed in the housing 242 adjacent the rotor assembly 246. The stator assembly 248 includes a stator core, such as the stator core 10 and a winding, such as the stator winding 50.

In accordance with the provisions of the patent statutes, the present invention has been described in what is considered to represent its preferred embodiment. However, it should be noted that the invention can be practiced otherwise than as specifically illustrated and described.

What is claimed is:

1. A stator for an electric machine comprising:
   a generally cylindrically-shaped stator core having a plurality of circumferentially-spaced and axially-extending core teeth that define a plurality of circumferentially-spaced and axially-extending core slots in a surface thereof, the core slots extending between a first and a second end of the stator core; and
   a stator winding having a plurality of phases, each phase including a pair of conductors connected in parallel and having a plurality of slot segments housed in the core slots, the slot segments alternatively connected at the first and second ends of the stator core by a plurality of end loop segments;
   at least half of the end loop segments connect a first slot segment housed in a radial position of a first core slot with a second slot segment housed in the same radial position of a second core slot,
   each pair of conductors including a first conductor and a second conductor, and having an end loop segment with a pitch of N, and an end loop segment with a pitch of N-2, such that the end loop segment of the first conductor and the end loop segment of the second conductor do not cross one another and each pair of conductors are substantially in phase with one another such that the stator has two slots per phase per pole.

2. The stator according to claim 1 wherein the conductors are connected to one another in a delta configuration.

3. The stator according to claim 1 wherein the conductors are connected to one another in a wye configuration.

4. The stator according to claim 1 wherein each terminal of the winding is connected to a diode pair.

5. The stator according to claim 1 wherein said slot segments are inserted into said core slots of said generally cylindrically-shaped stator core in a substantially radial direction.

6. The stator of claim 1 wherein at least half of said end loop segments each include at least one substantially sloped portion.

7. The stator of claim 6 wherein at least half of said end loop segments each include at least two radial adjustments.

8. The stator of claim 7 wherein the conductors of the winding are cascaded.

9. The stator according to claim 1 wherein said slot segments housed in said core slots are aligned in a radial row and have a substantially rectangular cross section.

10. The stator according to claim 1 wherein said stator is a stator for an alternator of a vehicle.

11. The stator according to claim 1 wherein at least one of said conductors of a particular one of said phases is formed of a continuous conductor.

12. A stator for an electric machine, comprising:
   a generally cylindrically-shaped stator core having a plurality of circumferentially-spaced and axially-extending core teeth that define a plurality of circumferentially-spaced and axially-extending core slots in a surface thereof, the core slots extending between a first and a second end of the stator core; and
   a stator winding having six conductors separated into three pairs, thereby defining a three phase stator wherein the conductors are connected to one another in one of a delta and a wye configuration and three terminals of the winding are connected to three diode pairs;
   each pair of conductors being connected in parallel and having a plurality of slot segments housed in the core slots, the slot segments alternatively connected at the first and second ends of the stator core by a plurality of end loop segments;
   at least half on the end loop segments connect a first slot segment housed in a radial position of a first core slot with a second slot segment housed in the same radial position of a second core slot,
   each pair of conductors being substantially in phase with one another such that the stator has two slots per phase per pole.

13. A stator for an electric machine, comprising:
   a generally cylindrically-shaped stator core having a plurality of circumferentially-spaced and axially-extending core teeth that define a plurality of circumferentially-spaced and axially-extending core slots in a surface thereof, the core slots extending between a first and a second end of the stator core; and
   a stator winding having a plurality of phases, each phase including a pair of conductors connected in parallel and having a plurality of slot segments housed in the core slots, the slot segments alternatively connected at the first and second ends of the stator core by a plurality of end loop segments;
   at least half of the end loop segments connect a first slot segment housed in a radial position of a first core slot with a second slot segment housed on the same radial position of a second core slot,
   each pair of conductors being substantially in phase with one another, wherein at least one end loop segment has a pitch equal to seven and at least one end loop segment has a pitch equal to five, and the stator has two slots per phase per pole.

14. A stator for an electric machine, comprising:
   a generally cylindrically-shaped stator core having a plurality of circumferentially-spaced and axially-extending core teeth that define a plurality of circumferentially-spaced and axially-extending core slots in a surface thereof, the core slots extending between a first and a second end of the stator core; and
   a stator winding having a plurality of phases, each phase including a pair of conductors and having a plurality of slot segments housed in the core slots, the slot segments alternately connected at the first and second ends of the stator core by a plurality of end loop segments, at least one of the end loop segments having a pitch equal to N and at least one of the end loop segments having a pitch equal to N-2.

15. The stator according to claim 14 wherein said N equals seven.

16. The stator according to claim 14 wherein at least one of the end loop segments has a pitch equal to N-1.

17. The stator according to claim 16 wherein said N equals seven.

18. The stator according to claim 14 wherein at least half of said end loop segments connect a first slot segment housed in a radial position of a first core slot with a second slot segment housed in the same radial position of a second core slot.

19. The stator according to claim 14 wherein at least one of said conductors of a particular one of said phases is formed of a continuous conductor.

* * * * *

UNITED STATES PATENT AND TRADEMARK OFFICE
CERTIFICATE OF CORRECTION

| | |
|---|---|
| PATENT NO. | : 7,005,772 B1 |
| APPLICATION NO. | : 11/100012 |
| DATED | : February 28, 2006 |
| INVENTOR(S) | : Dean Mark Frederick et al. |

It is certified that error appears in the above-identified patent and that said Letters Patent is hereby corrected as shown below:

Column 9, in claim 1, line 1, immediately after "electric machine" insert --,-- (comma).

Column 10, in claim 13, line 16, after "segment housed" delete "on" and substitute --in--

Signed and Sealed this

Seventh Day of November, 2006

JON W. DUDAS
*Director of the United States Patent and Trademark Office*